United States Patent
Al-Mehthel et al.

(10) Patent No.: US 9,796,629 B1
(45) Date of Patent: Oct. 24, 2017

(54) FIRE-RESISTANT SULFUR CONCRETE

(71) Applicants: Saudi Arabian Oil Company, Dhahran (SA); King Fahd University of Petroleum and Minerals, Dhahran (SA)

(72) Inventors: Mohammed H. Al-Mehthel, Dhahran (SA); Mohammed Maslehuddin, Dhahran (SA); Saleh H. Al-Idi, Dhahran (SA); Mohammed Rizwan Ali, Al-Khobar (SA)

(73) Assignees: Saudi Arabian Oil Company, Dhahran (SA); King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 15/443,708

(22) Filed: Feb. 27, 2017

(51) Int. Cl.
| | | |
|---|---|---|
| *C04B 28/36* | (2006.01) | |
| *C04B 18/14* | (2006.01) | |
| *C04B 14/06* | (2006.01) | |
| *C04B 14/28* | (2006.01) | |
| *C04B 111/28* | (2006.01) | |
| *C04B 111/23* | (2006.01) | |
| *C04B 111/27* | (2006.01) | |

(52) U.S. Cl.
CPC .............. *C04B 28/36* (2013.01); *C04B 14/06* (2013.01); *C04B 14/28* (2013.01); *C04B 18/141* (2013.01); *C04B 2111/23* (2013.01); *C04B 2111/27* (2013.01); *C04B 2111/28* (2013.01)

(58) Field of Classification Search
CPC ......... C04B 28/36; C04B 18/14; C04B 14/06; C04B 14/28; C04B 2111/28; C04B 2111/23; C04B 2111/27
See application file for complete search history.

(56) References Cited

U.S. PATENT DOCUMENTS

| | | | | |
|---|---|---|---|---|
| 4,188,230 A | * | 2/1980 | Gillott | C04B 28/36 501/140 |
| 4,256,499 A | * | 3/1981 | Terrel | C04B 28/36 501/140 |
| 4,293,463 A | * | 10/1981 | Vroom | C04B 28/36 524/493 |
| 4,311,826 A | | 1/1982 | McBee et al. | |
| 4,376,831 A | * | 3/1983 | Woo | C04B 28/36 106/287.29 |
| 4,391,969 A | * | 7/1983 | McBee | C04B 28/36 524/609 |
| 7,335,253 B2 | * | 2/2008 | Mesters | C01B 17/0216 106/736 |
| 8,137,456 B2 | * | 3/2012 | Van Trier | C04B 12/00 106/287.13 |
| 8,235,705 B2 | | 8/2012 | Kurakake et al. | |
| 8,252,222 B2 | * | 8/2012 | Biebaut | B28B 1/54 106/627 |
| 8,535,433 B2 | * | 9/2013 | Boer | C04B 28/365 106/287.1 |
| 8,545,616 B2 | * | 10/2013 | Lankshear | C04B 24/40 106/287.19 |
| 8,623,130 B2 | * | 1/2014 | De Boer | C04B 28/36 106/287.1 |
| 8,652,251 B2 | | 2/2014 | Al-Mehthel et al. | |
| 8,722,771 B2 | * | 5/2014 | Vaidya | C08L 95/00 524/121 |
| 8,758,212 B2 | | 6/2014 | Al-Mehthel et al. | |
| 8,772,380 B2 | * | 7/2014 | Vaidya | C08L 95/00 524/59 |
| 8,815,005 B2 | * | 8/2014 | Verbist | C04B 28/36 106/272 |
| 8,859,719 B2 | | 10/2014 | Mohamed et al. | |
| 8,895,641 B2 | * | 11/2014 | Vaidya | C08L 95/00 524/121 |
| 9,012,542 B2 | * | 4/2015 | Hussein | C08L 23/32 524/59 |
| 9,017,472 B2 | * | 4/2015 | de Boer | C04B 20/1051 106/287.1 |
| 9,085,488 B2 | | 7/2015 | Kalb et al. | |
| 9,359,256 B2 | | 6/2016 | Mohamed et al. | |
| 2011/0012289 A1 | | 1/2011 | Kurakake et al. | |
| 2012/0326355 A1 | | 12/2012 | Kurakake et al. | |

(Continued)

FOREIGN PATENT DOCUMENTS

| | | |
|---|---|---|
| CN | 2841805 Y | 11/2006 |
| CN | 103435293 A * | 12/2013 |

(Continued)

OTHER PUBLICATIONS

Al-Mehthel et al.,"Sulfur Extended Asphalt as a Major Outlet for Sulfur that Outperformed Other Asphalt Mixes in the Gulf", Presentation at The Sulphur Institute's (TSI) Sulphur World Symposium, 2010, Doha, Qatar, pp. 1-16.

*Primary Examiner* — Anthony J Green
(74) *Attorney, Agent, or Firm* — Bracewell LLP; Constance Gall Rhebergen

(57) ABSTRACT

A sulfur concrete has constituents that include a coarse aggregate in an amount in a range of 40-50 wt % of the weight of the sulfur concrete, a fine aggregate in an amount in a range of 20-40 wt % of the weight of the sulfur concrete, a fine filler in an amount in a range of 8-12 wt % of the weight of the sulfur concrete, and a binder in an amount in a range of 12-20 wt % of the weight of the sulfur concrete. The binder includes elemental sulfur in an amount in a range of 25-60 wt % of the weight of the binder and asphalt in an amount in a range of 40-75 wt % of the weight of the binder.

19 Claims, No Drawings

(56) References Cited

U.S. PATENT DOCUMENTS

| | | | |
|---|---|---|---|
| 2013/0192496 A1 | 8/2013 | Al-Mehthel et al. | |
| 2015/0027345 A1 | 1/2015 | Mohamed et al. | |
| 2015/0284494 A1* | 10/2015 | Hussein | C08L 23/32 525/330.4 |
| 2016/0137500 A1 | 5/2016 | Kim et al. | |

FOREIGN PATENT DOCUMENTS

| | | | |
|---|---|---|---|
| DE | 2534230 A1 | | 2/1977 |
| KR | 20040072278 | | 8/2004 |
| KR | 101390295 B1 | | 5/2014 |
| RU | 2306285 C2 | | 9/2007 |
| RU | 2534861 C1 | * | 12/2014 |
| RU | 2543838 C1 | * | 3/2015 |
| WO | WO 2014/009501 A1 | * | 1/2014 |
| WO | WO 2014/076280 A1 | * | 5/2014 |

* cited by examiner

FIRE-RESISTANT SULFUR CONCRETE

BACKGROUND OF THE DISCLOSURE

Field of the Disclosure

The present disclosure relates to a fire-resistant concrete. More specifically, the disclosure relates to a fire-resistant concrete composition using sulfur, and methods for making the same.

Description of the Related Art

Sulfur, a byproduct of oil refining, has been used to develop water- and acid-resistant concrete for use by the construction industry. Although, some sulfur concrete has exhibited good water- and acid-resistance, it has not performed well when exposed to fire. In addition, damage due to water ingress can be high when limestone is used as an aggregate.

SUMMARY OF THE DISCLOSURE

Embodiments of this disclosure provide a fire-resistant sulfur concrete that is also acid-resistant and stable in water irrespective of the type of aggregate used. The composition of the current disclosure includes asphalt and can have limestone aggregate and the method for making the composition includes heating for more than six hours. Because the developed sulfur concrete does not utilize water and Portland cement and is durable in all exposure conditions, systems and methods of this disclosure contribute to the sustainable development of concrete infrastructure. Compositions of this disclosure can be used for a variety of applications, such as acid-resistant tiles, concrete masonry units, thermal and fire insulation material, and fire and acid-resistant coatings.

In an embodiment of this disclosure, a sulfur concrete has constituents that include:

a coarse aggregate in an amount in a range of 40-50 wt % of the weight of the sulfur concrete;

a fine aggregate in an amount in a range of 20-40 wt % of the weight of the sulfur concrete;

a fine filler in an amount in a range of 8-12 wt % of the weight of the sulfur concrete; and a binder in an amount in a range of 12-20 wt % of the weight of the sulfur concrete, the binder including an elemental sulfur in an amount in a range of 25-60 wt % of the weight of the binder, and asphalt in an amount in a range of 40-75 wt % of the weight of the binder.

In alternate embodiments, the sulfur concrete can be free of an active filler. The fine aggregate can be sand and the fine filler can be limestone powder. The amount of elemental sulfur can be in a range of 6-7 wt % of the weight of the sulfur concrete.

In other alternate embodiments, the constituents of the sulfur concrete can include the coarse aggregate in an amount of 47 wt % of the weight of the sulfur concrete, the fine aggregate in an amount of 28 wt % of the weight of the sulfur concrete, the fine filler in an amount of 10 wt % of the weight of the sulfur concrete, the elemental sulfur in an amount of 6 wt % of the weight of the sulfur concrete, and the asphalt in an amount of 9 wt % of the weight of the sulfur concrete.

In other embodiments of this disclosure, a method of forming the sulfur concrete can include heating the coarse aggregate, the fine aggregate, the fine filler, and the binder to a temperature in a range of 130 to 150° C. and mixing the coarse aggregate, the fine aggregate, the fine filler, and the binder to achieve a homogeneous mix. A concrete member is formed with the homogeneous mix and the concrete member is maintained at a temperature in a range of 100 to 150° C. for at least 6 hours.

In alternate embodiments the concrete member can be maintained at the temperature in the range of 100 to 150° C. for 6-12 hours. The concrete member can be maintained at the temperature in the range of 100 to 150° C. for at least 24 hours. The concrete member can be maintained at the temperature in the range of 100 to 150° C. for a time sufficient to produce a fire-resistant concrete. The concrete member can be maintained at the temperature in the range of 100 to 150° C. for at least 6 hours before cooling the concrete member, wherein the concrete member is then able to withstand exposure to fire for at least one hour free of disintegration. Alternately, the concrete member can be maintained at the temperature of 140° C. for at least 24 hours.

In an alternate embodiment of this disclosure, a method of forming a sulfur concrete includes forming a constituent mix by mixing together:

coarse aggregates in an amount in a range of 40-50 wt % of the weight of the sulfur concrete;

fine aggregates in an amount in a range of 20-40 wt % of the weight of the sulfur concrete;

a fine filler in an amount in a range of 8-12 wt % of the weight of the sulfur concrete; and a binder in an amount in a range of 12-20 wt % of the weight of the sulfur concrete, the binder including elemental sulfur in an amount in a range of 25-60 wt % of the weight of the binder, and asphalt in an amount in a range of 40-75 wt % of the weight of the binder.

The constituent mix is heated to a temperature in a range of 130 to 150° C. to form a heated mix. The heated mix is mixed to achieve a homogeneous mix and a concrete member is formed with the homogeneous mix. The concrete member is maintained at a temperature in a range of 100 to 150° C. for at least 6 hours before allowing the concrete member to cool below 100° C.

In alternate embodiments, the amount of elemental sulfur can be in a range of 6-7 wt % of the weight of the sulfur concrete. The constituents of the sulfur concrete can include the coarse aggregate in an amount of 47 wt % of the weight of the sulfur concrete, the fine aggregate in an amount of 28 wt % of the weight of the sulfur concrete, the fine filler in an amount of 10 wt % of the weight of the sulfur concrete, the elemental sulfur in an amount of 6 wt % of the weight of the sulfur concrete, and the asphalt in an amount of 9 wt % of the weight of the sulfur concrete.

In other alternate embodiments, the concrete member can be maintained at the temperature in the range of 100 to 150° C. for 6-12 hours. The concrete member can be maintained at the temperature in the range of 100 to 150° C. for at least 24 hours. The concrete member can be maintained at the temperature in the range of 100 to 150° C. for a time sufficient to produce a fire-resistant concrete, wherein after cooling the concrete member is able to withstand exposure to fire for at least one hour free of disintegration. Alternately, the concrete member can be maintained at the temperature of 140° C. for a time sufficient to produce a fire-resistant concrete. After cooling, the compressive strength of the concrete member can be at least 1,000 psi.

DETAILED DESCRIPTION

Compositions and methods described in this disclosure provide for a fire-, acid-, and water-resistant sulfur concrete with constituents that include sulfur, asphalt, aggregates and filler.

Asphalt concrete is a composition that can be made from asphalt and aggregate or aggregates. While "aggregate" can be plural, the term "aggregates" generally refers to more than one type or more than one size of aggregate. As one of ordinary skill will appreciate, various types of conventional aggregates can be used as a filler in the concrete. The term "aggregates" can refer to aggregate of multiple types or sizes. Aggregate can include, for example, sand, gravel, crushed rock, slag, or any other type of aggregate. When aggregates of various sizes are used, the smaller aggregate materials can fill voids between the larger aggregate materials, thus creating a denser matrix. The aggregates used in concrete can be defined in terms of coarse aggregate and fine aggregate. Fine aggregates, also referred to as "fines," can include natural sand, crushed stone, or other suitable fine particles, with most particles smaller than 5 mm. Coarse aggregates generally include gravel or crushed stone with particles predominantly larger than 5 mm and typically between 9.5 mm and 37.5 mm.

In embodiments of the sulfur concrete of this disclosure, a coarse aggregate can be used that is inexpensive and readily available, such as crushed limestone. Alternately, the coarse aggregate can be other crushed aggregates, steel slag aggregates, gravel, or volcanic aggregates. The desired properties of the composition of this disclosure are achieved without the need for expensive or difficult to source aggregates. The desired weight and strength properties of the composition of this disclosure are achieved without the need for specialty or lightweight aggregates. Embodiments of this disclosure provide a sulfur concrete that is resistant to fire and exposure to acid and water, regardless of the type of coarse aggregate that is used. For example, even when using relatively inexpensive and readily available crushed limestone, systems and methods herein provide a fire, acid, and water-resistant sulfur concrete.

Embodiments of this disclosure include fine aggregates and fine filler. The fine aggregates can be common and easily available material, such as natural or manufactured sand. As used in this disclosure, fine aggregate is defined as aggregate passing through a #4 (4.75 mm) sieve. The fine filler can also be common and easily available material, such as limestone powder. As used in this disclosure, any materials that passes through a #50 sieve is defined as fine filler. The example limestone powder used in developing a sample specimen of this disclosure ranged in size from 5-20 μm. In embodiments of this disclosure, the sulfur concrete is free of an active filler. An active filler is a polymer that acts as a binder and modifies certain properties of sulfur concrete, such as its stiffness. These filler types are costly; consequently it is desirable to use any other filler that is cheap and also influences the properties of a sulfur concrete in a way similar to the active fillers.

There are many different types of asphalts available and their characteristics can vary quite significantly. An asphalt material can be a singular material or a blend of several base asphalts. All asphalts contain asphaltenes. Asphaltene concentration can vary in amount and functionality depending on the source of the base asphalt. As used herein, the term asphalt is interchangeable with the term bitumen. Asphalt is used as a glue to bind the ingredients of the sulfur concrete. In developing a sample specimen of this disclosure asphalt cement of grade 60/70 pen, from local refineries was utilized, but any type of asphalt could be used.

Sulfur, especially "free" or "elemental" sulfur, is an abundant and inexpensive material. Elemental sulfur is naturally occurring. Elemental sulfur is also a byproduct of non-sweet natural gas and petroleum processing. Sources of free sulfur include petroleum refineries and gas sweetening plants. Because of the quantity of sulfur extracted from natural gas and petroleum, many sulfur producers consider elemental sulfur a waste product. It is desirable to find commercial uses for elemental sulfur. Incorporating sulfur into commercial products can transform what many consider a potential "waste" product into a product that has practical value.

The elemental sulfur includes not only singular sulfur atoms but also sulfur in complexes and covalently bonded to other sulfur atoms, including α-sulfur (orthorhombic sulfur), β-sulfur (monoclinic sulfur), and "catena" sulfur. Chains or rings of sulfur atoms range from a few sulfur atoms to hundreds of covalently linked sulfur atoms. Because of the wide variety of allotropes, elemental sulfur is found in many different solid and liquid forms, and changes between forms based upon modifications to its environment.

Sulfur covalently bonded with non-sulfur atoms, such as carbon, hydrogen or other atomic species, including heter-organic compounds, is not "free" or elemental sulfur. Elemental sulfur should not contain any significant amounts of impurities.

Sulfur can form hydrogen sulfide ($H_2S$) gas, which is toxic to humans, starting at around 150° C. Above that temperature, free sulfur in hydrocarbon environments dehydrogenates hydrocarbons and forms hydrogen sulfide. Heating sulfur to high temperatures in the presence of oxygen forms sulfur dioxide, which is noxious to humans and is an air pollutant. It is desirable to find a combination of asphalt materials that can be mixed at temperatures no greater than 150° C. for worker comfort and safety as well as being safer to the environment.

In preparing the sulfur concrete in accordance with embodiments of this disclosure, the range of wt % each of the constituents, which include a coarse aggregate, a fine aggregate, a fine filler, and a binder, can be found in Table 1. The binder includes sulfur and asphalt. As used in this disclosure unless otherwise indicated, the unit wt % is measured relative to the weight of the sulfur concrete.

TABLE 1

Weight composition ranges of sulfur concrete.

| Constituent | Possible range wt % of sulfur concrete |
| --- | --- |
| Coarse aggregate | 40-50 |
| Fine aggregate | 20-40 |
| Fine filler | 8-12 |
| Binder | 12-20 |
| Elemental sulfur (as wt % of binder) | 25-60 |
| Asphalt (as wt % of binder) | 40-75 |

As can be seen from Table 1, the amount of elemental sulfur can be in an amount in a range of 25-60 wt % of the binder and the binder can be in an amount in a range of 12-20 wt % of the sulfur concrete. Therefore, the elemental sulfur can be in an amount in a range of 3-12 wt % of the sulfur concrete. In certain embodiments, the elemental sulfur can be in an amount in a range of 6-7 wt % of the sulfur concrete. In alternate embodiments, the wt % of each of the constituents can be within other ranges, as shown in the example mixes shown in Table 2 and Table 4.

In order to form the sulfur concrete, the coarse aggregate, the fine aggregate, the fine filler, and the binder can be mixed to form a constituent mix and then heated to a temperature in the range of 130 to 150° C. to form a heated mix.

Generally, asphalt and sulfur are added first to form a uniform mixture and then the aggregates are added. All the constituents are then mixed to obtain a uniform mixture. The heated mix of the coarse aggregate, the fine aggregate, the fine filler, and the binder can be mixed to achieve a homogeneous mix. Since the aggregates are also maintained at the same temperature as the sulfur-asphalt mixture, settling of sulfur is avoided. Rather, the sulfur-asphalt mixture binds the aggregates uniformly. The ingredients are mixed for about 5 to 10 minutes to achieve a homogenous mixture. Sulfur is mixed with asphalt and the binder (asphalt and sulfur) will be in molten phase when mixed with aggregates. The homogeneous mix can then be poured in a mold to form specimen of desired shape. The cast member is maintained at a temperature in a range of 100 to 150° C. for at least 6 hours before it is allowed to cool to a temperature below 100° C.

In alternate embodiments, the mold can be maintained at a temperature in the range of 100 to 150° C. for at least 6 hours, or can be maintained at a temperature in the range of 100 to 150° C. for 6-12 hours or for at least 24 hours. For example, the cast member can be maintained at the temperature in the range of 100 to 150° C. for a time sufficient to produce a fire-resistant concrete, so that after cooling, the cast member is able to withstand exposure to fire for at least one hour free of disintegration. In other alternate embodiments, the concrete member can be maintained at the temperature in the range of 140° C. for at least 24 hours or for a time sufficient to produce a fire-resistant concrete. In certain embodiments of this disclosure, the optimum time for maintaining a temperature of the cast member is about six hour. During the slow hardening and setting process the asphalt in sulfur forms a dense fire-resistant concrete.

The compressive strength of a concrete product formed in accordance with this disclosure can be more than 1,000 psi. The resulting sulfur concrete member is a concrete product that can be used for a variety of applications, such as acid-resistant tiles, concrete masonry units, thermal and fire insulation materials, and fire- and acid-resistant coatings.

EXAMPLES

Several trial mixtures of sulfur concrete were prepared. The weights of the mixture constituents in the trial mixtures are shown in Table 2.

TABLE 2

Example mixtures.

| Example # | Description | Constituents wt % of composition | | | | |
|---|---|---|---|---|---|---|
| | | Coarse Aggregate | Fine Aggregate | Fine Filler | Elemental Sulfur | Asphalt |
| 1 | Sulfur Mortar-No modifier | — | 72.5% dune sand | 10% limestone powder | 17.5% elemental powder | — |
| 2 | Sulfur Concrete-No modifier | 47% steel slag | 28% dune sand | 10% limestone powder | 15% elemental powder | — |
| 3 | Sulfur Mortar with 2.5% KFUPM modifier-1 | — | 72.5% dune sand | 10% limestone powder | 15% elemental powder | — |
| 4 | Sulfur Concrete with 2.5%KFUPM modifier-1 | 47% steel slag | 28% dune sand | 10% limestone powder | 12.5% elemental powder | — |
| 5 | Sulfur Mortar with 2.5% KFUPM modifier-2 | — | 72.5% dune sand | 10% limestone powder | 15% elemental powder | — |
| 6 | Sulfur Concrete with 2.5% KFUPM modifier-2 | 47% steel slag | 28% dune sand | 10% limestone powder | 12.5% elemental powder | — |
| 7 | Sulfur concrete-No modifier | 47% steel slag | 28% dune sand | 10% limestone powder | 15% elemental powder | — |
| 8 | Sulfur concrete-No modifier | 47% steel slag | 28% dune sand | 10% limestone powder | 15% elemental powder | — |
| 9 | Sulfur concrete modifier-Coated with High Alumina cement | 47% steel slag | 28% dune sand | 10% limestone powder | 15% elemental powder | — |
| 10 | Sulfur concrete-No modifier-Coated with Avikote AV 650 | 47% steel slag | 28% dune sand | 10% limestone powder | 15% elemental powder | — |
| 11 | Sulfur concrete-No modifier-Coated with Avikote WB1200 | 47% steel slag | 28% dune sand | 10% limestone powder | 15% elemental powder | — |
| 12 | Sulfur concrete-No modifier-Coated with Bitumen | 47% steel slag | 28% dune sand | 10% limestone powder | 15% elemental powder | — |
| 13 | Sulfur concrete without modifier-binder is 40% Sulfur and 60% Asphalt | 47% steel slag | 28% dune sand | 10% limestone powder | 15% elemental powder | — |
| 14 | Steel slag concrete-No modifier binder is 75% Sulfur and 25% Asphalt. | 47% steel slag | 28% dune sand | 10% limestone powder | 15% elemental powder | — |

For Examples 3-6, two types of sulfur binders, namely KFUPM-1 and KFUPM-2 that were developed by the inventors were used. In examples 13-14, asphalt from a local refinery was used. The molded specimens were maintained at around 130° C. for at least 6 hours before they were allowed to gradually cool down to the room temperature.

A series of experiments were conducted with varying examples incorporating sulfur to determine their fire-resistance. Slab specimens were prepared with examples 1-14 as detailed in the Table 1 and exposed to fire. The condition of the specimens before and after exposure to fire is described in Table 3. As explained in Table 3 most of the systems evaluated have exhibited low fire-resistance. However, specimens prepared with the constituents of example 13 (sulfur concrete with asphalt) showed appreciable fire-resistance. The specimen was intact even after one hour of exposure to fire. As is known to one with skill in the art, 30 minutes of exposure to fire is a standard for indicating the fire-resistance of a concrete material.

TABLE 3

Condition after exposure to fire.

| Example # | Observations and Remarks |
|---|---|
| 1 | Specimen started to crumble in about three minutes. 25% of the specimen disintegrated within seven minutes. The specimen completely crumbled and broke after 12 minutes of exposure to the fire. |
| 2 | Crackling sound from the specimen. Softening of the specimens was noted within one minute of exposure to fire. Crumbling of the specimen noted within four minutes and 25% of it was lost after 10 minutes. The specimen broke in two in 20 minutes. |
| 3 | Particles started falling apart after about three minutes of exposure to fire. About 25% of the specimen started to disintegrate after four minutes and within 15 minutes almost all the specimen crumbled. |
| 4 | Spalling of aggregates noticed within three minutes. About 25% of the specimen was disintegrated within four minute. Almost all the specimen was lost within 18 minutes. |
| 5 | Spalling and disintegration of the specimen was noted within three minutes while 25% of the specimen was disintegrating within five minutes. About 50% of the specimen was lost in 12 minutes. |
| 6 | Spalling and disintegration of the specimen was noted within three minutes. About 25% of the specimen disintegrated within four minutes whereas 90% of the specimen was lost within 18 minutes. |
| 7 | Disintegration of the specimen was noted within three minutes while 50% of the specimen was lost within 11 minutes. |
| 8 | Disintegration of the specimen started within four minutes while 60% of the specimen was lost in 12 minutes. |
| 9 | The coating started to crack after about five minutes of heating. After eight minutes of heating, the coating was completely fell apart and the specimen seen to melt and disintegrate. In about 9 minutes, 60% of the specimen was lost due to melting. |
| 10 | The cementitious coating was intact after five minutes of heating. Though the coating was intact, the specimen started to melt after about 5 minutes of heating. The specimen started disintegrating and in about eight minutes, 25% of the specimen was lost due to melting. |
| 11 | The specimen started disintegrating after about 4 minutes and 25% of it was lost due to melting. |
| 12 | The specimen started disintegrating in about six minutes and 25% of it was lost due to melting. |

TABLE 3-continued

Condition after exposure to fire.

| Example # | Observations and Remarks |
|---|---|
| 13 | No softening, melting, or disintegration of the specimen was noted even after 40 minutes of heating. Heating was stopped after about one hour, as the specimen was intact. |
| 14 | The specimen started to soften within two minutes of heating. Loss of aggregate was noted after three minutes of heating. 25% of thickness was lost within seven minutes of heating. |

Based on the trials a mixture was selected for detailed evaluation. The weights of constituents in the tested mixture are shown in Table 4.

TABLE 4

Weights of constituents in sulfur concrete used in detailed evaluation.

| Constituent | Tested Mix wt % of sulfur concrete |
|---|---|
| Coarse aggregate | 47 |
| Fine aggregate | 28 |
| Fine filler | 10 |
| Elemental sulfur | 6 |
| Asphalt | 9 |

For the tested mix, shown in Table 4, the coarse aggregate was crushed limestone, the fine aggregate was dune sand, and the fine filler was limestone powder. The mixture constituents and the casting and curing conditions were similar to those detailed above from Table 3. The specimen resulting from the tested mix was stable in water with different types of coarse aggregates.

In order to determine acid-resistance, three, 50×50×50 mm cubic specimens were exposed to 2% sulfuric acid solution. The acid resistance of the sulfur mortar and sulfur concrete specimens was evaluated periodically through visual examination, and photographic evidence was recorded. A comparison was also based on the photographic evidence of the specimens before and after exposure to acid.

Therefore, sulfur concrete prepared in accordance with the embodiments described herein provide a concrete member that can be used, for example, as acid-resistant tiles, concrete masonry units, thermal and fire insulation material, and fire and acid-resistant coatings, using constituents that are inexpensive and readily available.

Although embodiments of the present disclosure have been described in detail, it should be understood that various changes, substitutions, and alterations can be made hereupon without departing from the principle and scope of the disclosure. Accordingly, the scope of the present disclosure should be determined by the following claims and their appropriate legal equivalents.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within the said range.

As used herein, the term "about" modifying the quantity or property refers to variation in the numerical quantity that can occur, for example, through typical measuring and handling procedures in the real world; through inadvertent error in these procedures; through differences in the manufacture, source, or purity of the ingredients employed to make the compositions or carry out the methods; and the like. In any case, the term "about" means within 10% of the reported numerical value, preferably within 5% of the reported numerical value.

Throughout this application, where patents or publications are referenced, the disclosures of these references in their entireties are intended to be incorporated by reference into this application, in order to more fully describe the state of the art to which the disclosure pertains, except when these references contradict the statements made herein.

What is claimed is:

1. A sulfur concrete, the constituents of the sulfur concrete comprising:
   a coarse aggregate in an amount in a range of 40-50 wt % of a weight of the sulfur concrete;
   a fine aggregate in an amount in a range of 20-40 wt % of the weight of the sulfur concrete;
   a fine filler in an amount in a range of 8-12 wt % of the weight of the sulfur concrete; and
   a binder in an amount in a range of 12-20 wt % of the weight of the sulfur concrete, the binder including:
      an elemental sulfur in an amount in a range of 25-60 wt % of the weight of the binder; and
      asphalt in an amount in a range of 40-75 wt % of the weight of the binder.

2. The sulfur concrete of claim 1, wherein the sulfur concrete is free of an active filler.

3. The sulfur concrete of claim 1, wherein the fine aggregate is sand and the fine filler is limestone powder.

4. The sulfur concrete of claim 1, wherein the amount of elemental sulfur is in a range of 6-7 wt % of the weight of the sulfur concrete.

5. The sulfur concrete of claim 1, wherein the constituents of the sulfur concrete include:
   the coarse aggregate in an amount of 47 wt % of the weight of the sulfur concrete;
   the fine aggregate in an amount of 28 wt % of the weight of the sulfur concrete;
   the fine filler in an amount of 10 wt % of the weight of the sulfur concrete;
   the elemental sulfur in an amount of 6 wt % of the weight of the sulfur concrete; and
   the asphalt in an amount of 9 wt % of the weight of the sulfur concrete.

6. A method of forming the sulfur concrete of claim 1, the method including:
   heating the coarse aggregate, the fine aggregate, the fine filler, and the binder to a temperature in a range of 130 to 150° C.;
   mixing the coarse aggregate, the fine aggregate, the fine filler, and the binder to achieve a homogeneous mix;
   forming a concrete member with the homogeneous mix; and
   maintaining the concrete member at a temperature in a range of 100 to 150° C. for at least 6 hours.

7. The method of claim 6, including maintaining the concrete member at the temperature in the range of 100 to 150° C. for 6-12 hours.

8. The method of claim 6, including maintaining the concrete member at the temperature in the range of 100 to 150° C. for at least 24 hours.

9. The method of claim 6, including maintaining the concrete member at the temperature of 140° C. for at least 24 hours.

10. The method of claim 6, including maintaining the concrete member at the temperature in the range of 100 to 150° C. for a time sufficient to produce a fire-resistant concrete.

11. The method of claim 6, including maintaining the concrete member at the temperature in the range of 100 to 150° C. for at least 6 hours before cooling the concrete member, wherein the concrete member is then able to withstand exposure to fire for at least one hour free of disintegration.

12. A method of forming a sulfur concrete, the method including:
   forming a constituent mix by mixing together:
      a coarse aggregate in an amount in a range of 40-50 wt % of a weight of the sulfur concrete;
      a fine aggregate in an amount in a range of 20-40 wt % of the weight of the sulfur concrete;
      a fine filler in an amount in a range of 8-12 wt % of the weight of the sulfur concrete; and
      a binder in an amount in a range of 12-20 wt % of the weight of the sulfur concrete, the binder including elemental sulfur in an amount in a range of 25-60 wt % of the weight of the binder, and asphalt in an amount in a range of 40-75 wt % of the weight of the binder;
   heating the constituent mix to a temperature in a range of 130 to 150° C. to form a heated mix;
   mixing the heated mix to achieve a homogeneous mix;
   forming a concrete member with the homogeneous mix; and
   maintaining the concrete member at a temperature in a range of 100 to 150° C. for at least 6 hours before allowing the concrete member to cool below 100° C.

13. The method of claim 12, wherein the amount of elemental sulfur is in a range of 6-7 wt % of the weight of the sulfur concrete.

14. The method of claim 12, wherein the constituents of the sulfur concrete include:
   the coarse aggregate in an amount of 47 wt % of the weight of the sulfur concrete;
   the fine aggregate in an amount of 28 wt % of the weight of the sulfur concrete;
   the fine filler in an amount of 10 wt % of the weight of the sulfur concrete;
   the elemental sulfur in an amount of 6 wt % of the weight of the sulfur concrete; and
   the asphalt in an amount of 9 wt % of the weight of the sulfur concrete.

15. The method of claim 12, including maintaining the concrete member at the temperature in the range of 100 to 150° C. for 6-12 hours.

16. The method of claim 12, including maintaining the concrete member at the temperature in the range of 100 to 150° C. for at least 24 hours.

17. The method of claim 12, including maintaining the concrete member at the temperature of 140° C. for a time sufficient to produce a fire-resistant concrete.

18. The method of claim 12, including maintaining the concrete member at the temperature in the range of 100 to 150° C. for a time sufficient to produce a fire-resistant concrete, wherein after cooling the concrete member is able to withstand exposure to fire for at least one hour free of disintegration.

19. The method of claim 12, wherein after cooling, a compressive strength of the concrete member is at least 1,000 psi.

\* \* \* \* \*